C. F. NICKERSON.
BELT FOR GROOVED PULLEYS.
APPLICATION FILED FEB. 6, 1920.
1,371,513.
Patented Mar. 15, 1921.
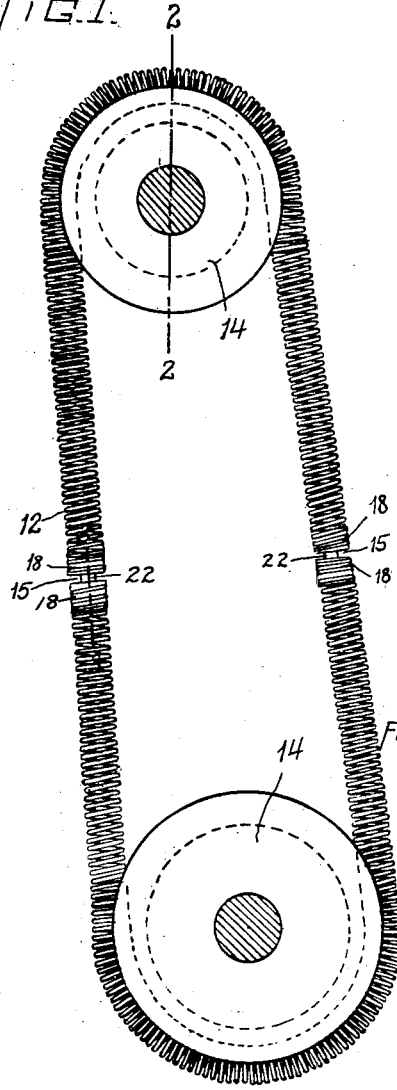
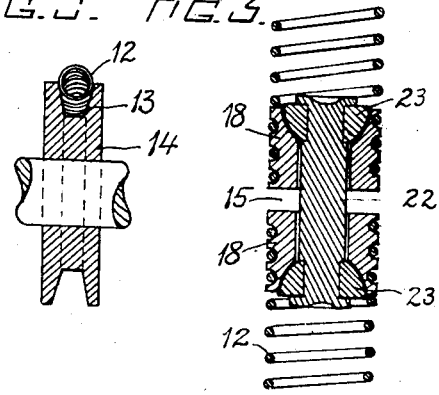
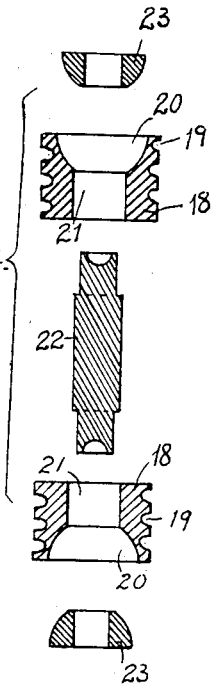
INVENTOR:
C. F. Nickerson
by Hughs, Brown, Quinby & May
ATT'YS.

UNITED STATES PATENT OFFICE.

CHARLES F. NICKERSON, OF READING, MASSACHUSETTS.

BELT FOR GROOVED PULLEYS.

1,371,513. Specification of Letters Patent. Patented Mar. 15, 1921.

Application filed February 6, 1920. Serial No. 356,699.

*To all whom it may concern:*

Be it known that I, CHARLES F. NICKERSON, a citizen of the United States, residing at Reading, in the county of Middlesex and State of Massachusetts, have invented new and useful Improvements in Belts for Grooved Pulleys, of which the following is a specification.

This invention relates to a belt adapted to connect a pair of grooved pulleys and composed mainly of helical wire, the convolutions of which frictionally engage the inclined sides of the peripheral grooves of the pulleys.

I have found that the convolutions of a helical wire belt, while contacting with the sides of the pulley grooves, are turned or twisted by such contact, so that unless the belt is provided with means for eradicating the twist between the pulleys, the belt soon becomes inoperative.

My invention is embodied in an improved belt comprising a length of helical wire, and a swivel coupling composed of collars adapted to detachably engage convolutions at the end portions of the wire, and a rod passing through the bores of the collars, and having stops loosely confining the collars spaced apart on the rod, the collars being adapted to turn independently on the rod to permit the eradication of twist from the wire, and to tip independently on the rod and thus conform the coupling to the curvature of the pulleys.

Of the accompanying drawings forming a part of this specification,—

Figure 1 is a side elevation of a belt embodying the invention, engaged with two grooved pulleys.

Fig. 2 is a section on line 2—2 of Fig. 1.

Fig. 3 is a section on line 3—3 of Fig. 1.

Fig. 4 is a sectional view of the swivel coupling members separated from each other, the members being shown as assembled in Fig. 3.

The same reference characters indicate the same parts in all of the figures.

In carrying out my invention I construct a belt mainly of helical wire 12, the diameter of the convolutions of which is such that said convolutions are adapted to engage the oppositely inclined sides of a groove 13 in a pulley 14.

The end convolutions of the wire are separated from each other by a gap 15, and these and some of the adjacent convolutions are detachably engaged with annular collars 18, having external helical grooves 19, adapted to engage said convolutions, and internal sockets 20, forming enlargements of the bores 21 of said collars. The collars 18 are screwed into the end portions of the helical wire, so that the wire and the coupling, of which the collars are members, are detachably connected, the coupling being separable from the wire to permit the renewal of a broken wire.

22 represents a coupling rod extending through the bores 21, and having ball members 23 loosely entering the sockets 20 and constituting stops confining the collars spaced apart on the rod. The ball members 23 may be rings or collars slipped upon the end portions of the rod 22 and secured thereto by upsetting the cupped ends of said rod, as shown by Fig. 3.

The rod 22 and its stops 23 are formed to permit the collars and the wire convolutions engaged therewith to turn freely on the rod, and thus permit the eradication of twist imparted to the wire. The sockets 20 and bores 21 of the collars 18 are formed to loosely surround the rod and its stops, as shown by Fig. 3, so that the collars are adapted to tip independently on the rod, and the coupling as a whole is adapted to be flexed in passing over a pulley, and thus conform to the curvature of the latter.

I prefer to make the wire portion of the belt in a plurality of independent lengths, connected at two or more points by the described swivel couplings, the number of lengths and couplings depending on the length of the belt. I have found it advisable in a belt thirty-two inches long, to employ three lengths of wire and three of the described couplings.

It will be seen that a swivel connection is provided between the convolutions of the wire, at the gap 15, whereby twist imparted to the wire by contact with the pulleys is eradicated between the pulleys.

I claim:

A pulley belt adapted to connect a pair of grooved pulleys, and comprising a length of helical wire, and a flexible swivel coupling, forming with the wire an endless belt, and composed of two cylindrical collars having longitudinal bores, and helically grooved peripheries with which convolutions at the end portions of the length of wire are detachably engaged, and a rod passing through said bores and having stops at its opposite ends loosely confining the collars spaced apart on the rod, the rod and stops being formed to permit the collars to turn independently on the rod and thus permit the eradication of twist imparted to the wire by the pulleys, and to tip independently on the rod, and thus conform the coupling to the curvature of the pulleys.

In testimony whereof I have affixed my signature.

CHARLES F. NICKERSON.